(12) United States Patent
Kuskin

(10) Patent No.: US 7,133,958 B1
(45) Date of Patent: Nov. 7, 2006

(54) MULTIPLE PERSONALITY I/O BUS

(75) Inventor: Jeffrey Kuskin, Mountain View, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 153 days.

(21) Appl. No.: 10/934,039

(22) Filed: Sep. 3, 2004

Related U.S. Application Data

(60) Provisional application No. 60/590,457, filed on Jul. 23, 2004.

(51) Int. Cl.
*G06F 13/20* (2006.01)
*G06F 13/36* (2006.01)

(52) U.S. Cl. .................. 710/313; 710/314; 710/315

(58) Field of Classification Search ............... 710/313, 710/314, 315
See application file for complete search history.

(56) References Cited

U.S. PATENT DOCUMENTS

| | | | | |
|---|---|---|---|---|
| 4,322,846 A | * | 3/1982 | Carroll et al. ............... | 714/46 |
| 5,608,736 A | * | 3/1997 | Bradford et al. ............ | 714/727 |
| 5,973,748 A | * | 10/1999 | Horiguchi et al. .......... | 348/554 |
| 2002/0116552 A2 | * | 8/2002 | Verinsky et al. ............... | 710/5 |
| 2003/0056052 A1 | * | 3/2003 | Ehmann et al. ............. | 710/305 |
| 2005/0235063 A1 | * | 10/2005 | Wilson ....................... | 709/227 |

* cited by examiner

*Primary Examiner*—Rehana Perveen
*Assistant Examiner*—Jeremy S. Cerullo
(74) *Attorney, Agent, or Firm*—Bever, Hoffman & Harms, LLP; Jeanette S. Harms

(57) ABSTRACT

To efficiently personalize multiple bus interfaces, an input/output (I/O) integrated circuit (IC) is provided. This I/O IC can include two local bus control blocks, wherein each local bus control block can be configured to provide a selected personality. The selected personality can include an IDE (intelligent drive electronics) interface, an MPEG-TS (Moving Picture Experts Group Transport Stream) interface, a GPIO (general purpose input/output) interface, or a PCI (peripheral component interconnect) interface. Advantageously, when the two local bus control blocks are configured, they can provide one of a combined IDE/MPEG-TS interface, a combined IDE/GPIO interface, and the PCI interface. Thus, the I/O IC has a common set of pins that can be allocated to one or more bus types, depending on net pin count.

20 Claims, 3 Drawing Sheets

MULTIPLE PERSONALITY I/O BUS

RELATED APPLICATIONS

This application claims priority of U.S. Provisional Patent Application 60/590,457, entitled "Multiple Personality I/O Bus" filed Jul. 23, 2004.

BACKGROUND OF THE INVENTION

1. Field of the Invention

The present invention relates to buses and, more particularly, to reconfigurable buses that can share pins of an input/output (I/O) integrated circuit (IC).

2. Description of the Related Art

In the design of integrated circuit (IC) devices, physical device pins represent a finite cost. If a device is designed to interconnect using more than one type of bus interface, then physical device pins to accommodate each type of bus will typically be allocated. Because not all forms of bus interface will likely be used at the same time, valuable pin resources are effectively wasted.

Therefore, a need arises for an efficient means of personalizing one or more bus interfaces using one common set of physical device pins.

SUMMARY OF THE INVENTION

To efficiently personalize multiple bus interfaces, an input/output (I/O) integrated circuit (IC) is provided. This I/O IC can include two local bus control blocks connectable to a host and a device. Notably, each local bus control block can be configured to provide a selected personality. The selected personality can include an IDE (intelligent drive electronics) interface, an MPEG-TS (Moving Picture Experts Group Transport Stream) interface, a GPIO (general purpose input/output) interface, or a PCI (peripheral component interconnect) interface. Advantageously, when the two local bus control blocks are configured, they can provide one of a combined IDE/MPEG-TS interface, a combined IDE/GPIO interface, and the PCI interface.

The I/O IC can further include an internal data bus for transferring signals between the two local bus control blocks and the device. In one embodiment, the internal data bus can be an AMBA (Advanced Microcontroller Bus Architecture) bus. An exemplary device could be a mass storage device or a wireless device. An exemplary host could include a system CPU and/or a media subsystem. For example, in one embodiment, the system CPU could be connected to one of the two local bus control blocks and the media subsystem, comprising a video demodulator/encoder chain, could be connected to the other local bus control blocks.

Control of the pins of the I/O IC may be performed entirely by software (e.g. by means of register manipulation) or by means of hardware support (e.g. state machines and direct memory access (DMA) engines).

DETAILED DESCRIPTION OF THE FIGURES

Conventional devices designed to interconnect using more than one type of bus interface have allocated pins to accommodate each type of bus. Unfortunately, because not all forms of bus interface will likely be used at the same time, valuable pin resources are effectively wasted. In accordance with one aspect of the invention, a common set of pins may be allocated to one or more bus types, depending on the net pin count. Control of the pins may be performed by software or by hardware support.

Figure 1:
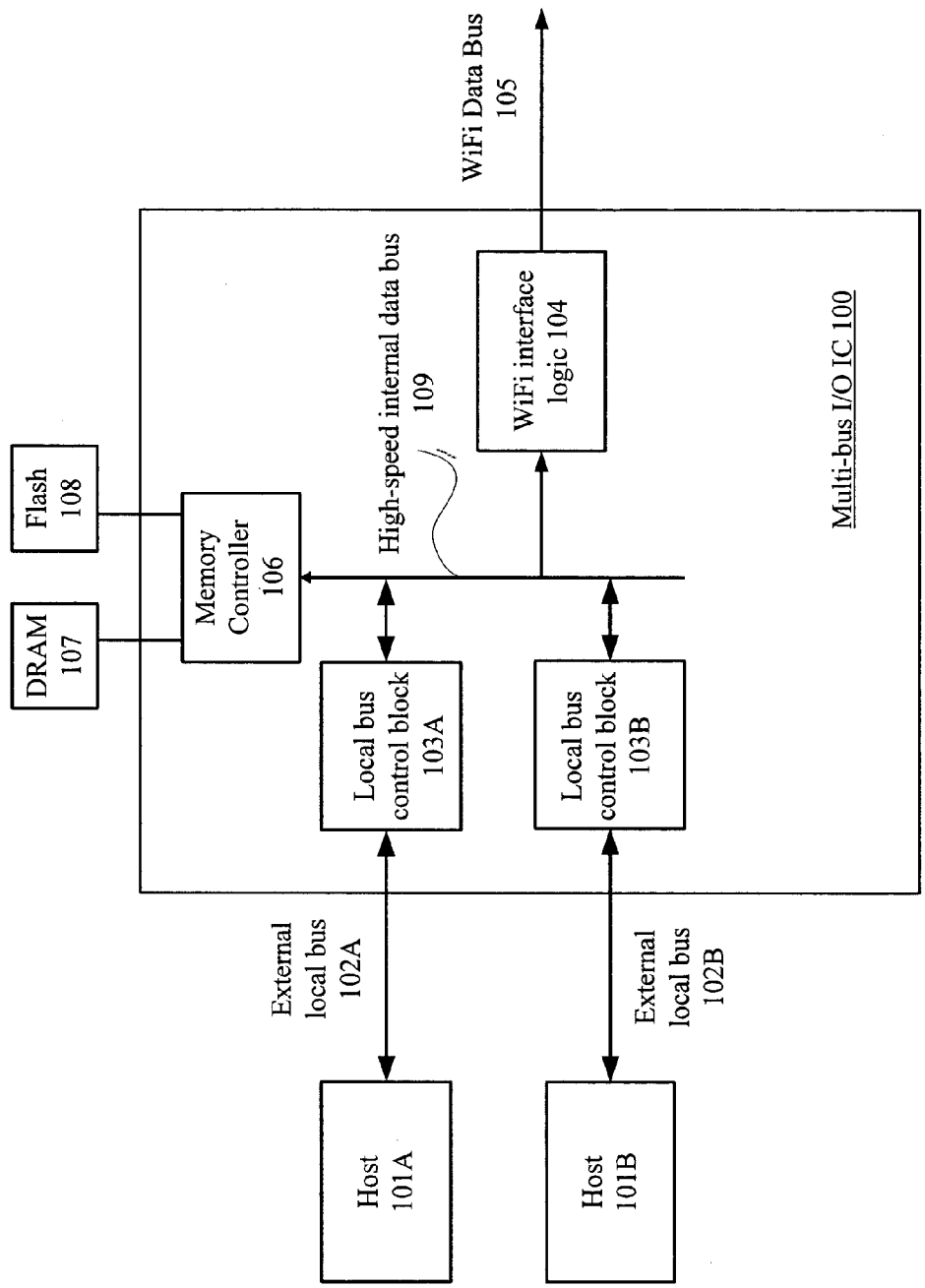
FIG. 1 illustrates a block diagram of an exemplary multi-bus input/output (I/O) integrated circuit (IC) including two reconfigurable local bus control blocks coupled to a high-speed internal data bus.

FIG. 1 illustrates an exemplary input/output (I/O) integrated circuit (IC) 100 including two reconfigurable local bus control blocks 103A and 103B (each generically referenced herein as reconfigurable local bus control block 103) that can provide a configurable pin interface to a high-speed internal data bus 109. Notably, local bus control block 103 can be controlled by software (e.g. with register manipulation) or hardware support (e.g. with state machines or direct memory access (DMA) engines).

Figure 2:
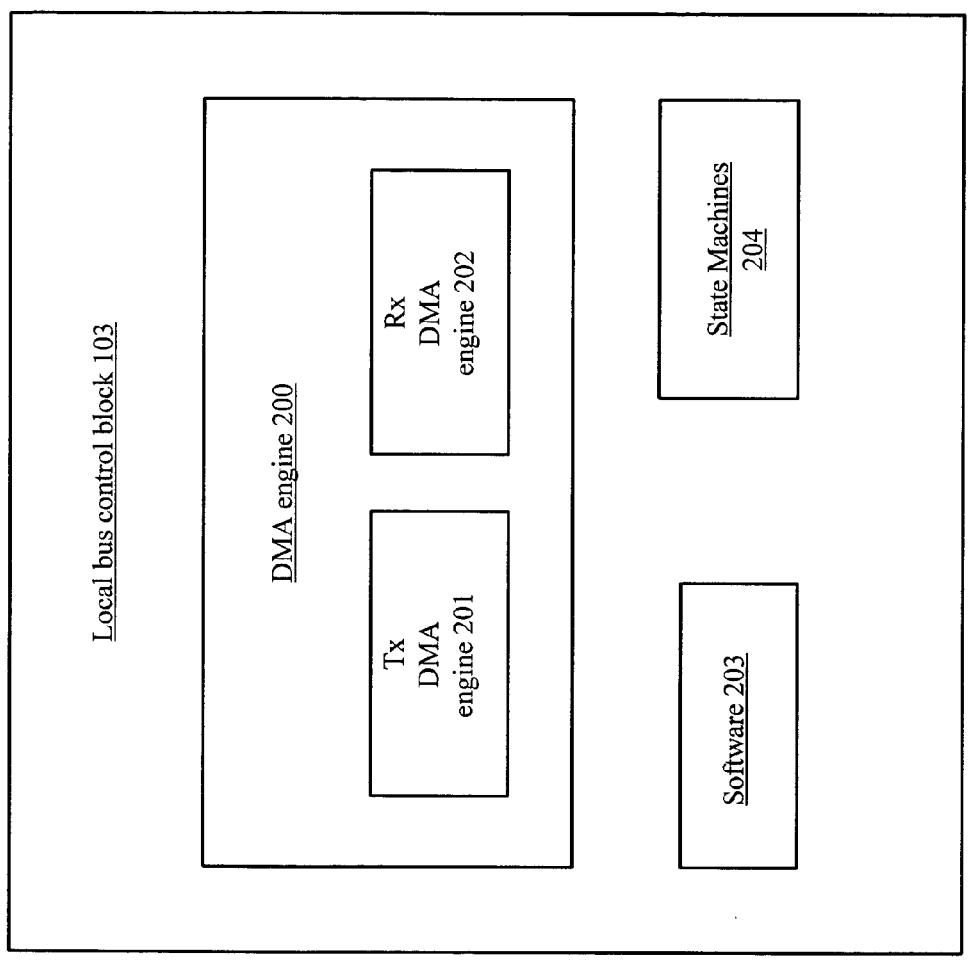
FIG. 2 illustrates an exemplary reconfigurable local bus control block for the multi-bus I/O IC of FIG. 1.

FIG. 2 illustrates an exemplary reconfigurable local bus control block 103 that can include, a DMA engine 200, software 203, and/or state machines 204. DMA engine 200 may further comprise a TX DMA engine 201 and an RX DMA engine 202 that can generate output and input transfer controls, respectively. With these transfer controls, local bus control blocks 103A and 103B can advantageously provide an interface between external local buses 102A and 102B to high-speed internal data bus 109. In one embodiment, high-speed internal data bus 109 can conform to the Advanced Microcontroller Bus Architecture (AMBA) specification as set forth in the AMBA® Specification (Rev. 2.0), published by ARM, Ltd.

In some embodiments, DMA engine 200 can accelerate data transfers between the external environment (i.e. external to multi-bus I/O IC 100) and high-speed internal data bus 109. In other embodiments, DMA engine 200 may perform simple block copy operations between the external environment and high-speed internal data bus 109. Note that DMA engine 200 may also have logic specific to the MPEG-TS data transfer format that assists a host 101 in combining, uncombining, and otherwise manipulating an MPEG-TS stream.

In one embodiment, each of reconfigurable local bus control blocks 103 may be configured into one of the four "personalities" listed in Table 1. A personality corresponds to the interface style presented to the external environment and determines the data width, flow control, arbitration, and other bus handshaking and protocol features by which an external agent communicates via external local bus 102. In one embodiment, the personality selected for either external local bus 102 can be changed while the system is operating by reconfiguring the corresponding local bus control block 103. Note that a host 101 or a user interfacing with a host 101 can select the desired personality.

TABLE 1

Local bus personalities

| Personality Name | Description |
| --- | --- |
| IDE | IDE-style local bus. |
| MPEG-TS | Transport stream local bus |

TABLE 1-continued

Local bus personalities

| Personality Name | Description |
| --- | --- |
| PCI | Standard PCI client interface |
| GPIO | General purpose I/O |

IDE (intelligent drive electronics) refers an interface to one or more mass storage devices. Notably, in accordance with one aspect of the invention, the IDE personality supports slave mode only. Note that a master IDE mode would require significantly more pins, i.e. 40 pins. Therefore, a slave IDE mode advantageously reduces the number of pins (referenced in Table 2), thereby facilitating the configurable pin designations (also referenced in Table 2).

MPEG-TS (Moving Picture Experts Group Transport Stream) refers to a transport stream bus compatible with the ISO/IEC 13818-1:2000 Specification that defines, in part, an MPEG-2 system standard, including Transport Stream (TS) encoding.

PCI (peripheral component interconnect) refers to a common local bus standard developed by Intel Corporation.

GPIO (general purpose input/output) refers to a flexible, parallel interface that allows for multiple custom connections. Note that because of these custom connections, the general purpose I/O is completely under the control of the driver CPU. Further note that no DMA support is available in the GPIO personality. This interface performs two tasks. First, the interface synchronizes transitions on local bus inputs to the driver CPU clock. Second, the interface transitions on the local bus outputs to the local bus "clk" signal.

In one embodiment, the number of physical device pins of multi-bus I/O IC 100 may be optimized by limiting the possible combinations to those listed in Table 2.

TABLE 2

Supported Local Bus Combinations

| Local bus 102A | Local bus 102B |
| --- | --- |
| IDE slave (29 pins) | MPEG-TS (18 pins) |
| GPIO (29 pins) | MPEG-TS (18 pins) |
| PCI (51 pins) | |

Note that the first two combinations would require 47 pins (i.e. 29+18=47) whereas the third combination would require 51 pins. In one embodiment, to maximize flexibility, 51 pins can be designated for external local bus use, thereby allowing any of the three combinations to be implemented.

Table 3 lists exemplary pins for an external local bus 102 configured to appear as an MPEG-TS port. In Table 3 (and other subsequent tables), the signal is followed by a parenthetical, which includes a short description of the signal and the number of pins used to provide that signal.

TABLE 3

MPEG-TS Personality Pinouts

MPEG-TS Personality

Clk (clock, 1)
Gnt (bus grant, 1)
Req (bus request, 1)
WHold (wireless control indication, 1)

TABLE 3-continued

MPEG-TS Personality Pinouts

MPEG-TS Personality

EAHold (external agent control indication, 1)
Valid (transaction valid indication, 1)
Type (transaction type, 4)
Data (data, 8)
Total pins: 18

Table 4 lists exemplary pins for an external local bus configured to appear as a PCI port.

TABLE 4

PCI Personality Pinouts

PCI Personality

PCI_CLK (system clock, 1)
PCI_RST# (system reset, 1)
PCI_AD (time-mutliplexed address/data bus, 32)
PCI_CBE# (command/byte enable, 4)
PCI_PAR (parity for AD and CBE, 1)
PCI_FRAME# (duration of PCI transaction, 1)
PCI_TRDY# (target ready to complete current data phase, 1)
PCI_IRDY# (initiator ready to complete current data phase, 1)
PCI_STOP# (targets wants to stop current transaction, 1)
PCI_DEVSEL# (target selected indication, 1)
PCI_IDSEL (selects current device as target for configuration transaction, 1)
PCI_PERR# (parity error, 1)
PCI_SERR# (system error, 1)
PCI_REQ# (initiator request for PCI ownership, 1)
PCI_GNT (arbiter grants the PCI ownership, 1)
PCI_INTA# (interrupt request, 1)
PCI_CLKRUN# (clock running-power saving, 1)
Total pins: 51

Table 5 lists exemplary pins for an external local bus configured to appear as an IDE port.

TABLE 5

IDE Personality Pinouts

IDE Personality

Clk (clock, 1)
OE_L (output enable, 1)
CS_L (cable select, 1)
CS1_L (unused, 1)
RDY_L (ready, 1)
WE_L (write enable, 1)
WAIT_L (wait, 1)
ASTROBE_L (unused, 1)
ADDR (address, 4)
DATA (data, 16)
INTR (interrupt, 1)
Total pins: 29

In the IDE personality, TX DMA engine 201 can be responsible for transferring blocks arriving from, for example, an external host (e.g. host 101A or 101B of FIG. 1) into, for example, an I/O IC-controlled memory (e.g. DRAM 107 or flash 108 via a memory controller 106). Note that because local bus control block 103 operates only as a slave, a CPU of host 101 is responsible for "pushing" all control and data blocks into multi-bus I/O IC 100 as well as for actively "pulling" the control and data blocks from such memory.

In one embodiment, TX DMA engine 201 can support multiple "endpoints", also known as destinations. Endpoints may denote a circuit, bus, or device for receiving the transmitted data. For example, in one embodiment, an endpoint could include a wireless transceiver. To implement this embodiment, multi-bus I/O IC 100 (FIG. 1) can include WiFi interface logic 104 that couples high-speed internal data bus 109 to a WiFi data bus 105, wherein WiFi data bus 105 can transfer data to and from a WiFi transceiver device (illustrated in FIG. 3).

Note that multi-bus I/O IC 100 can support the concurrent transfer of different types of information having various transport characteristics. For example, if multi-bus I/O IC 100 is functioning as a wireless video and data transport support device, multiple video and data streams can be transferred simultaneously, wherein such streams could have different bandwidth, latency, priority, and other transport characteristics.

To accommodate the varying characteristics of potentially multiple simultaneous video and data streams, DMA engine 200 can support endpoints functioning as logically separate DMA channels (i.e. controlled independently from all other endpoints implemented on a particular interface). This independent control means that each endpoint can be associated with a separate stream of DMA descriptors (wherein each descriptor includes a number of data fields that can indicate to a DMA controller where to find a next buffer and how large that buffer is). Moreover, each endpoint may also have its own set of static configuration settings. Because DMA engine 200 can treat each endpoint independently, steady-state flow control or other events that cause a halt in the DMA associated with a particular endpoint do not affect other endpoints within the same interface.

For each packet, a host 101 can select the appropriate endpoint and then push the data packet and related control information to multi-bus I/O IC 100. Host 101 can communicate data and control information by writing and reading different addresses within the local bus address space (e.g. the 4-bit ADDR field in Table 5), where the local bus is configured as an IDE interface. In one embodiment, address bit 0 selects a byte within a halfword-sized (e.g. 16 bit) register. Therefore, as described in Tables 6 and 7, there can be a total of eight halfword-sized registers available, located at even addresses (0, 2, 4, . . . 14). Of these, as described in Table 6, addresses 0 and 2 can be used to control Tx DMA engine 201.

TABLE 6

Local Bus Tx DMA Address Usage

| Local bus address | Description |
|---|---|
| 0 | Data block length/endpoint indication |
| 2 | Data block data. |

As indicated in Table 6, the local bus address 0 can be used to indicate the size and endpoint for the next data block to be pushed into multi-bus I/O IC 100. In one embodiment, the format of the write data can be [11:0] for data block length (in bytes), [13:12] for endpoint number, and [15:14] for the type of data. The local bus address 2 can be used to push the contents of the data block into mutli-bus I/O IC 100. Note that reads to either address are undefined.

In one embodiment, to push a single data block into multi-bus I/O IC 100, a host 101 can perform two steps in sequence. First, host 101 can write to local bus address 0 to indicate the size of the next data block to be pushed and the endpoint to which it is directed. Second, host 101 can perform a series of writes to local bus address 2 to push the contents of the data block into multi-bus I/O IC 100.

Because local bus control block 103 can support a 16-bit data bus, the number of required writes is equal to the size of the data block (as specified by the write to local bus address 0) divided by 2 plus one additional write if the data block contains an odd number of bytes. For an odd-size data block, the final write can contain the final data byte in bits [7:0] of the write data.

In one embodiment, host 101 may not intermix pushes of data blocks destined for different endpoints. In this case, host 101 may signal its intent to push a new data block by writing to local bus address 0 and then pushing all bytes of the data block via writes using local bus address 2. The host may not begin a new data block (via a write to local bus address 0) until it has pushed the entire data block corresponding to the most recent write to the endpoint indicated in the local bus address 0.

An Rx DMA engine 202 can transfer data blocks from the I/O IC-controlled memory (e.g. DRAM 107 or flash 108 via a memory controller 106) to a host 101. Similarly to the transmit (Tx) side, the receive (Rx) side must accommodate the slave-only operation of external local bus 102. Specifically, RX DMA engine 202 can rely on a "pull" model in which Rx DMA engine 202 indicates to a host 101 that new data is available but then waits for host 101 to pull the data from the I/O IC-controlled memory (because Rx DMA engine 202 lacks a means to actively push the data). Note that in one embodiment, unlike Tx DMA engine 201, Rx DMA engine 202 supports only a single endpoint.

In one embodiment, local bus addresses 4 and 6 can be used to control Rx DMA engine 202, as described in Table 7.

TABLE 7

Local Bus Rx Address Usage

| Local bus address | Description |
|---|---|
| 4 | Status information on next data block |
| 6 | Data block contents |

As indicated in Table 7, reads to the local bus address 4 can return information about the next data block ready for transfer from multi-bus I/O IC 100 to a host 101. Thus, local bus address 4 can advantageously provide a means for host 101 to determine whether a new data block is available for transfer. In one embodiment, host 101 may retrieve data from the I/O IC by polling address 4 until an indication that a new data block is available appears. At this point, host 101 can read the contents of the block via a series of reads to local bus address 6.

In one embodiment, the format of the read data can be [11:0] for size (in bytes) of the data block contents remaining to be transferred, [13:12] for the type of data, [14] is reserved, and [15] indicates validity (e.g. if this bit is set, then data is available to be transferred via reads to local bus address 6, otherwise no data is presently available).

In one embodiment, to pull a single data block into multi-bus I/O IC 100, a host 101 can perform two steps in sequence. First, host 101 can poll local bus address 4 until bit 15 is set, thereby indicating that a new data block is available, and then reading local bus address 4 to determine the size of the next data block. Second, host 101 can read local bus address 6 to retrieve the contents of the data block. In one embodiment, reads to local bus address 6 return the next two bytes of the data block. If only one byte remains in the data block, then this byte can be returned in bits [7:0] of the read data.

Note that writes to either of local bus addresses 4 and 6 are undefined.

Figure 3:
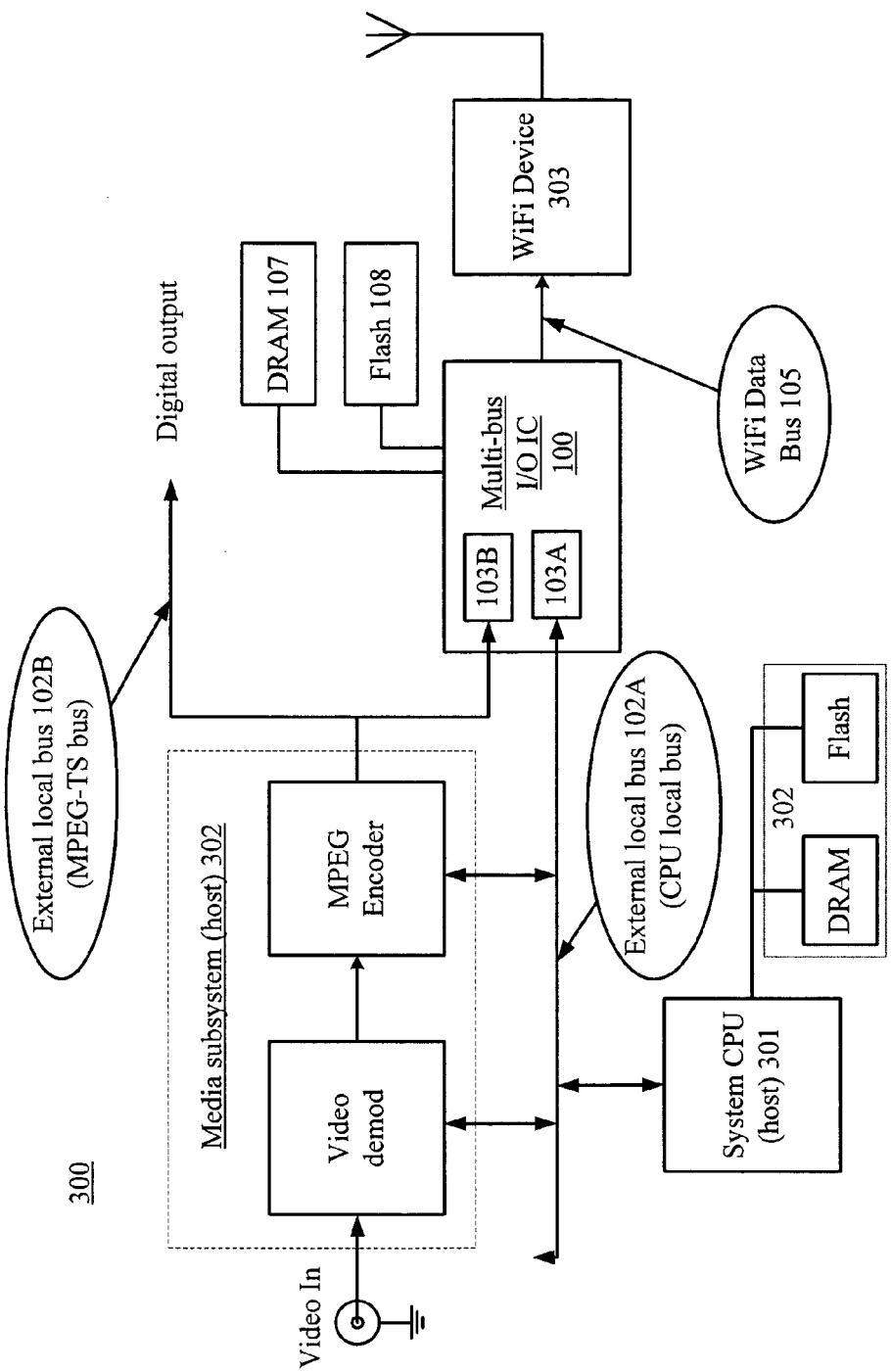
FIG. 3 illustrates an exemplary system including the multi-bus I/O IC of FIG. 1 that can encode a WiFi transmission stream.

FIG. 3 illustrates an exemplary system 300 including multi-bus I/O IC 100 (FIG. 1) that can encode a WiFi (i.e. a networking environment based upon the IEEE 802.11 family of standards) transmission stream. In system 300, multi-bus I/O IC 100 can facilitate communication between a media subsystem 302 (which could function as host 101A), a system CPU 301 (which could function as host 101B), and a WiFi device 303. In this embodiment, media subsystem 302 can include a video demodulator and a video encoder.

In system 300, external local bus 102B can function as an MPEG-TS bus whereas external local bus 102A can function as a CPU local bus (see Table 2, second configuration). In this configuration, local bus control block 103A of multi-bus I/O IC 100 can be configured as a GPIO port to allow system CPU 301 to communicate over external local bus 102A. Moreover, local bus control block 103B of multi-bus I/O IC 100 can be configured as an MPEG-TS port to allow media subsystem 302 to communicate over external local bus 102B.

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, the multi-bus I/O IC could be reconfigured to serve other applications. For example, a system could include a peripheral device in lieu of the system CPU and/or the media subsystem. In this case, the local bus configuration blocks could be configured as a PCI port (see Table 2, third configuration).

Accordingly, it is intended that the scope of the invention be defined by the following claims and their equivalents.

The invention claimed is:

1. An integrated circuit (IC) for facilitating communication between at least one host and at least one device, the IC for performing an input/output (I/O) function, the IC comprising:
   a set of pins allocated to host interfacing;
   a first local bus control block connected to a first number of the set of pins;
   a second local bus control block connected to a second number of the set of pins,
   wherein each local bus control block is configurable to provide a selected personality,
   wherein the selected personality includes one of an IDE (intelligent drive electronics) interface, an MPEG-TS (Moving Picture Experts Group Transport Stream) interface, a GPIO (general purpose input/output) interface, and a PCI (peripheral component interconnect) interface,
   wherein the two local bus control blocks, when configured, provide one of a combined IDE/MPEG-TS interface, a combined IDE/GPIO interface, and the PCI interface, and
   wherein each of the first and second numbers of pins are usable for multiple personalities.

2. The IC of claim 1, further including an internal data bus for transferring signals between the first and second local bus control blocks and the at least one device.

3. The IC of claim 2, wherein the internal data bus is an AMBA (Advanced Microcontroller Bus Architecture) bus.

4. The IC of claim 1, wherein one device is a mass storage device and the first and second local bus control blocks support slave mode only.

5. The IC of claim 1, wherein one device is a wireless device.

6. The IC of claim 1, wherein the at least one host includes a system CPU.

7. The IC of claim 1, wherein the at least one host includes a media subsystem.

8. The IC of claim 1, wherein the at least one host includes:
   a system CPU connectable to the first local bus control blocks; and
   a media subsystem connectable to the second local bus control block.

9. The IC of claim 1, wherein at least one of the first and second local bus control blocks includes a direct memory access (DMA) engine.

10. The IC of claim 1, wherein at least one of the first and second local bus control blocks includes software.

11. The IC of claim 1, wherein at least one of the first and second local bus control blocks includes state machines.

12. The IC of claim 1, wherein when the selected personality includes the IDE interface, a first set of registers provide a transmit function and a second set of registers provide a receive function.

13. The IC of claim 12, wherein the first set of registers includes a pair of half-word registers 0 and 2.

14. The IC of claim 13, wherein the half-word register 0 provides transmit control and the half-word register 2 provides transmit data.

15. The IC of claim 12, wherein the second set of registers includes a pair of half-word registers 4 and 6.

16. The IC of claim 15, wherein the half-word register 4 provides receive control and the half-word register 6 provides receive data.

17. A method of facilitating communication between at least one host and at least one device using an input/output (I/O) integrated circuit (IC), the method comprising:
   connecting two local bus control blocks of the I/O IC to a set of dedicated pins associated with external local buses, one local bus control block using a first number of the dedicated pins and another local bus control block using a second number of the dedicated pins,
   wherein the two local bus control blocks are configurable to provide selected personalities, and wherein the selected personalities include an IDE (intelligent drive electronics) interface, an MPEG-TS (Moving Picture Experts Group Transport Stream) interface, a GPIO (general purpose input/output) interface, and a PCI (peripheral component interconnect) interface; and
   configuring the two local bus control blocks to provide either a combined personality interface or a single personality interface.

18. The method of claim 17, wherein the two local bus control blocks are configured to provide the combined personality interface, and the combined personality interface is a combined IDE/MPEG-TS interface.

19. The method of claim 17, wherein the two local bus control blocks are configured to provide the combined personality interface, and the combined personality interface is a combined IDE/GPIO interface.

20. The method of claim 17, wherein the two local bus control blocks are configured to provide the single personality interface, and the single personality interface is the PCI interface.

* * * * *